UNITED STATES PATENT OFFICE.

CHARLES WEIZMANN AND GEORGE ANTHONY HAMLYN, OF LONDON, ENGLAND.

FERMENTATION PROCESS FOR THE PRODUCTION OF ACETONE AND BUTYL ALCOHOL.

1,329,214. Specification of Letters Patent. Patented Jan. 27, 1920.

No Drawing. Application filed March 27, 1918. Serial No. 225,138.

*To all whom it may concern:*

Be it known that we, Doctor CHARLES WEIZMANN, a subject of the King of Great Britain and Ireland, and residing at 67 Addison road, London, W., England, formerly of 41 Campden House road, Kensington, London, W., England, and GEORGE ANTHONY HAMLYN, a subject of the King of Great Britain and Ireland, and residing at 35 Brunswick Square, Bloomsbury, London, W. C., England, have invented certain new and useful Improvements Relating to Fermentation Processes for the Production of Acetone and Butyl Alcohol, of which the following is a specification.

This invention relates to the industrial production of butyl alcohol and acetone by the fermentation of carbohydrates contained in grain like maize, rice, wheat, rye, dari, etc. See 4th edition Allen's *Commercial Organic Analysis*, vol. 1, pages 413-415.

In the course of investigations of the group of amylobacter Arthur Mayer & Bredemann, conducted with a view to determining the products of fermentation of carbohydrates by the various species of this group, one of us discovered that certain bacteria believed to be *Granulobacter pectinovorum* or closely allied thereto, by direct action ferment maize and other starch containing materials, with or without admixture of other carbohydrates, giving large yields of butyl alcohol and acetone. This industrial fermentation forms the subject matter of Patent No. 4845 of 1915.

We have now been investigating further the action of numerous other species of the amylobacter group or genus, see article by Dr. G. Bredemann in the *Zentralblatt fur Bakteriologie*, 11 division, Volume XXIII, pages 385 to 568, *e. g.*, *Clostridium Americanum* Pringsheim, *Clostridium Pasteurianum*, *Bacillus butylicus* of Fitz, *Bacillus butyricus* Grassberger and Schattenfroh, *Granulobacter saccharo butyricum* Beijerinck, *Bac. amylobacter* Arthur Mayer and Bredemann, etc., and other bacilli isolated from flax, grain, water, soil, etc., on maize, wheat, rye, rice, dari and similar materials, dari being a substance belonging to the rice group of starch containing material.

We have found that those bacteria, although morphologically related, differ widely in their chemical and fermentative action on the carbohydrate materials. In many cases either no fermentation sets in at all, or the fermentation is so weak that scarcely any starch is attacked, and the yield of products of fermentation is extremely small.

As a result of our further investigations, we suppose that the bacteria of the amylobacter group or genus are not able practically to act upon the protein contained in the carbohydrate material in a way such as to render it digestible by the organisms, but that if the protein be suitably predigested, most of the species will act easily, and give fairly good yields.

This invention therefore consists in submitting the sterilized carbohydrate mash to the action of molds or enzyms prepared from them which have a strong proteolytic action without giving practically disturbing products, prior to the introduction of the bacteria of the amylobacter group.

The invention further consists in subjecting the sterilized carbohydrate mash to the action of a mold such as *Aspergillus oryzæ*, and then fermenting with bacteria of the amylobacter group.

By the qualification "without giving practically disturbing products" we mean without giving *e. g.*, organic acids or alcohols of kinds or in quantities which would seriously interfere with the acetone and butyl alcohol fermentation, and we refer below to molds or enzyms as "suitable" in order to imply this characteristic.

In carrying this invention into effect in one form, by way of example, we prepare a sterilized mash in the usual way from rice, maize or other grain, and inoculate this mass with a culture of *Aspergillus oryzæ*. The *Aspergillus oryzæ* is allowed to grow on the mash for a period of some three to four days at a temperature varying between 30° C. and 37° C. The mash is then, without further sterilization, inoculated with one of the above mentioned cultures of the amylobacter, which normally does not produce any active fermentation. Fermentation sets in very rapidly, and continues for a period of from 48 to 60 hours. When the fermentation is completed, the product is distilled, and a mixture of butyl alcohol and acetone is obtained, which may be separated by fractional distillation in the usual way. The yield of these products varies between 15 per cent. and 20 per cent. of the weight of the grain taken.

Instead of allowing the mold itself to grow on the sterilized mash, the mash may be treated to the action of the enzym produced by the mold in a liquid on which it grows, this enzym being added to the mash in the quantity required, depending on its concentration.

We have found that the mold and the bacteria may be introduced together into the sterilized mash with a considerable saving of time, this not involving any disadvantage so far as has been yet observed.

Having now described our invention, what we claim as new and desire to secure by Letters Patent is:—

1. A process of producing acetone and butyl alcohol consisting in submitting a sterilized starchy mash to the action of molds having a strong proteolytic action and fermenting the mash by bacteria of the amylobacter group.

2. A process of producing acetone and butyl alcohol consisting in submitting a sterilized starchy mash to the action of enzyms of molds having a strong proteolytic action and fermenting the mash by bacteria of the amylobacter group.

3. A process of producing acetone and butyl alcohol consisting in submitting a sterilized starchy mash to the action of the enzyms of molds having a strong proteolytic action and after the lapse of a period inoculating with bacteria of the amylobacter group.

4. A process for the production of acetone and butyl alcohol comprising acting on starchy matter by the enzyms of *Aspergillus oryzœ* and a fermenting organism of the amylobacter group.

5. A process for the production of acetone and butyl alcohol comprising acting on starchy matter with *Aspergillus oryzœ* and a fermenting organism of the amylobacter group.

In testimony whereof we have signed our names to this specification.

CHARLES WEIZMANN.
GEORGE ANTHONY HAMLYN.